| United States Patent [19] | [11] 3,920,634 |
| Dinner | [45] Nov. 18, 1975 |

[54] 2,3-DIHYDROESTRA-1,3,5(10)-TRIENO (16α,17α-β) FURAN-17β OLS

[75] Inventor: Alan Dinner, Indianapolis, Ind.

[73] Assignee: Eli Lilly and Company, Indianapolis, Ind.

[22] Filed: Aug. 30, 1974

[21] Appl. No.: 502,131

[52] U.S. Cl. ............ 260/239.55 R; 260/397.5
[51] Int. Cl.² ............................ C07J 17/00
[58] Field of Search ................ 260/239.55

[56] References Cited
UNITED STATES PATENTS

| 3,045,012 | 7/1962 | Kurath et al. | 260/239.55 |
| 3,089,874 | 5/1963 | Karath et al. | 260/239.55 |
| 3,764,596 | 10/1973 | Galantay | 260/239.55 |

*Primary Examiner*—Elbert L. Roberts
*Attorney, Agent, or Firm*—Charles W. Ashbrook; Walter E. Buting; Everet F. Smith

[57] ABSTRACT

2′,3′-Dihydroestra-1,3,5(10)-trieno[16α,17α-b]furan-17β-ols are new compounds useful in the treatment of menopausal syndrome and other conditions of estrogen deficiency.

5 Claims, No Drawings

2,3-DIHYDROESTRA-1,3,5(10)-TRIENO (16α, 17α-β) FURAN-17β OLS

BACKGROUND OF THE INVENTION

The estrogens comprise a group of sterodial hormones which is largely responsible for female development and accompanying phenomena. The major medical use of estrogens is in replacement therapy in cases of estrogen deficiency. Certain estrogens have found limited use for treatment of prostate and breast cancer. Additionally, limited estrogen therapy has been used for the prevention of heart attacks and treatment of atherosclerosis.

Several valuable estrogens have been provided by chemical alterations of the natural products. 17α-Ethynyl estradiol, for example, is one of the most potent estrogens known, and is prepared by the reaction of an acetylide on estrone. The 3-cyclopentyl ether of 17α-ethynylestriol is an extremely potent estrogen having a favorably uterotropic-vaginal ratio, U.S. Pat. No. 3,697,558.

Several steroids are known which possess a γ-lactone ring fused to ring D of the steroid nucleus. Sarsasapogenin, for instance, contains a tetrahydrofuran derivative fused to ring D of the androstane nucleus. No estrogenic steroids have heretofore been known which contain a furan ring fused to ring D at the 16α-17α positions in addition to a 17αhydroxyl group.

It is an object of this invention to provide new compounds which are cyclized derivatives of 17α-ethynylestriol and which compounds possess estrogenic activity.

SUMMARY OF THE INVENTION

This invention relates to novel pentacyclic steroids. In particular, this invention provides estrogen-like compounds of the formula

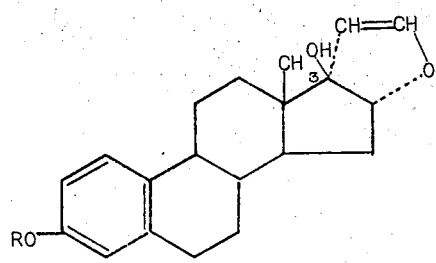

I in which R is hydrogen, $(C_1-C_3)$ alkyl, or $(C_5-C_6)$ cycloalkyl. The compounds of this invention are useful in treating menopausal syndrome.

DETAILED DESCRIPTION OF THE INVENTION

The compounds of this invention are estradiol derivatives which have a dihydrofuran ring fused to ring D of the steroid. The preferred compounds provided herein have the above formula wherein R is hydrogen or $(C_5-C_6)$ cycloalkyl, and most preferably R is $(C_5-C_6)$ cycloalkyl. Typical $(C_5-C_6)$ cycloalkyl groups include cyclopentyl and cyclohexyl. R can also be selected from among $(C_1-C_3)$ alkyl groups, such as methyl, ethyl, n-propyl, or isopropyl for example.

The compounds of the present invention are named as dihydroestrafurans, in accordance with accepted steroid nomenclature procedures. For example, when R of the above formula is cyclopentyl, the new steroid is named 3-(cyclopentyloxy)-2′,3′-dihydroestra-1,3,5(10)-trieno-[16α,17α-b]furan-17β-ol. The dihydroestrafurans of this invention can be prepared by cyclizing a 17α-ethynylestriol having the general formula

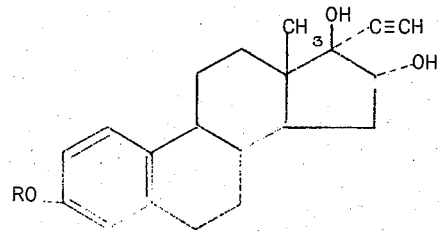

II in which R has the above defined meaning. During the cyclization reaction, the 16α-hydroxyl adds to the acetylenic bond, thus forming the pentacylic ring structure of the compounds of this invention. More specifically, a 17α-ethynylestriol of the above formula is contacted with a suitable base, preferably in a solvent, thereby effectively causing the addition of a hydroxyl group across an acetylenic linkage. While any of a number of bases can be used to effect the cyclization reaction, the preferred bases are the alkali metal hydroxides. Commonly used bases include sodium hydroxide or potassium hydroxide. Bases such as sodium hydride, potassium tert.-butoxide, butyl lithium, and similar bases can be used if desired. The quantity of base generally used in the reaction is from about 1 to about 10 molar amounts; however, more can be used if desired. The cyclization reaction is most conveniently carried out in an unreactive solvent, preferably an organic solvent such as an alcohol, ether, halogenated hydrocarbon, aromatic hydrocarbon, or the like. The especially preferred solvents include alcohols such as methanol or ethanol. Ethers such as dioxane or diglyme can be utilized when desired. The reaction is most efficiently carried out at an elevated temperature, especially at a temperature in the range from about 30°C. to about 120°C. The reaction is typically carried out at the reflux temperature of the reaction solvent. The cyclization is substantially complete after about 15 to 30 hours; however, longer reaction times do not appear detrimental to the dihydroestrafuran thus produced. The dihydroestrafuran can be isolated by simply removing the reaction solvent, for example by evaporation, and further purification of the product can be carried out by standard techniques such as column chromatography, recrystallization, or the like.

As hereinbefore indicated, the starting materials for the compounds of this invention include 17α-ethynylestriol, or ether derivatives thereof. The preparation of these latter compounds is described in detail in U.S. Pat. No. 3,697,558. It should be understood that the cyclization reaction described hereinabove can be carried out on ethers of 17α-ethynylestriols, or alternatively the cyclization can be carried out on the parent 17α-ethynylestriol and the desired ether can subsequently be prepared by procedures set forth in U.S. Pat. No. 3,697,558.

The compounds provided herein are useful pharmacological agents due to their estrogenic activity. The compounds are useful in the treatment of menopausal syndrome or other estrogen-deficiency conditions and can be administered orally or parenterally. The compounds are generally administered in doses of 1 to about 20 mg. For oral administration, the estrogen-like compounds can be mixed with a suitable diluent or carrier, and formulated as a tablet, elixir, or capsule for convenient administration. Typical diluents or carriers commonly used include starch, propylene glycol, dextrose, sorbitol or the like. The active drug can also be admixed with one or more active hormonal substances, such as estradiol or medroxyprogesterone for example. The compounds described herein are additionally useful in replacement therapy for under-developed female animals, and for the treatment of various reproductive disorders.

The following detailed examples will serve to more fully describe the preparation of the new estrogenic compounds provided herein. The examples should not be construed as limiting the invention to the particular aspects described therein. In the examples, the compounds are identified by melting point, characteristic infrared absorptions given in wavenumbers (cm$^{-1}$), mass spectral data (m/e), and nuclear magnetic resonance absorptions, given in delta values ($\delta$).

EXAMPLE 1

3-Cyclopentyloxy-2',3'-dihydroestra-1,3,5(10)-trieno-[16α,17α-b]furan-17β-ol.

A solution of 1.0 g. of 17α-ethynylestra-1,3,5(10)-trieno-3,16α,17β-triol 3-cyclopentyl ether in 250 cc. of a 0.05 molar solution of potassium hydroxide in methanol was heated at reflux for 24 hours. The reaction mixture was cooled to 25°C. and the solvent was removed under reduced pressure, providing a yellow solid. The yellow solid was chromatographed over 50 g. of Woelm Silica Gel, Activity 1, using a five percent solution (v/v) of ethyl acetate in benzene as the eluant. Eluate fractions shown to contain 3-cyclopentyloxy-2',3'-dihydroestra-1,3,5(10)-trieno[16α,17α-b]-furan-17β-ol by thin layer chromatography were combined and the solvent was removed therefrom under reduced pressure. 3-Cyclopentyloxy-2',3'-dihydroestra-1,3,5(10)-trieno[16α,17α-b]-furan-17β-ol was thus obtained in 85 percent yield; M.P. 130°–131°C. IR (KBr): 3490 (OH), 2930 and 2860 (CH); m/e: 280.2358, calc. for $C_{25}H_{32}O_3$ 380.2351; nmr (pyridine-$d_5$):

| | | |
|---|---|---|
| δ 7.4–6.8 | " | (3H,m,aromatic) |
| δ 6.7 | | (1H,d,J=2.5, olefinic) |
| δ 5.2 | | (1H,d,J=2.5, olefinic) |
| δ 1.2 | | (3H,s,CH$_3$) |

EXAMPLE 2

2',3'-Dihydroestra-1,3,5(10)-trieno[16α,17α-b]furan-3,17β-diol.

Following the procedure set forth in example 1 above, 17α-ethynylestra-1,3,5(10)-trieno[16α,17α-b]furan-3,17β-diol in 70 percent yield. M.P. 210°–212°C. IR. (KBr): 3400 (OH), 2950 and 2850 (CH); m/e: 312.1721, calc. for $C_{20}H_{24}O_3$, 312.1725.

EXAMPLE 3

3-Methoxy-2',3'-dihydroestra-1,3,5(10)-trieno[16α,17α-b]furan-17β-ol.

Following the procedure set forth in example 1, 17α-ethynylestra-1,3,5(10)-trieno-3,16α,17β-triol 3-methyl ether was converted to 3-methoxy-2',3'-dihydroestra-1,3,5(10)-trieno[16α,17α-b]furan-17β-ol.

I claim:
1. The compound of the formula

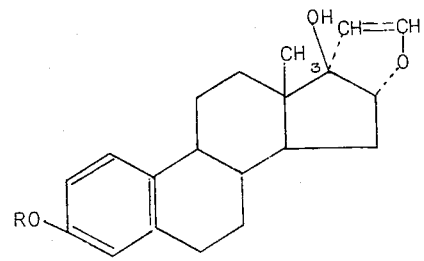

wherein:
R is hydrogen, ($C_1$-$C_3$) alkyl, or ($C_5$-$C_6$) cycloalkyl.
2. The compound according to claim 1 wherein R is hydrogen, said compound being 2',3'-dihydroestra-1,3,5(10)-trieno[16α,17α-b]3,17β-diol.
3. The compound according to claim 1 wherein R is $C_5$-$C_6$ cycloaklyl.
4. The compound according to claim 3 wherein R is cyclopentyl, said compound being 3-cyclopentyloxy-2',3'-dihydroestra-1,3,5(10)-trieno[16α,17α-b]furan-17β-ol.
5. The compound according to claim 1 wherein R is $C_1$-$C_3$ alkyl.

* * * * *

UNITED STATES PATENT AND TRADEMARK OFFICE
CERTIFICATE OF CORRECTION

PATENT NO. : 3,920,634
DATED : November 18, 1975
INVENTOR(S) : Alan Dinner

It is certified that error appears in the above-identified patent and that said Letters Patent are hereby corrected as shown below:

The title should read -- 2',3'-DIHYDRO-1,3,5(10)-TRIENO[16α,17α-b]FURAN-17β-OLS

In column 1, line 29, "17αhydroxyl" should read -- 17β hydroxyl --.

In column 4, line 6, "17α-ethynylestra-1,3,5(10)trieno-[16α,17α-" should read -- 17α-ethynylestra-1,3,5(10)-trieno-3,16α-17β-triol was converted to 2',3'-dihydroestra-1,3,5-(10)-trieno[16α,17α- --.

In column 4, line 39, "1,3,5(10)-trieno[16α,17α-b]3,17β-diol" should read -- 1,3,5(10)-trieno[16α,17α-b]furan-3,17β-diol --.

Signed and Sealed this first Day of June 1976

[SEAL]

Attest:

RUTH C. MASON
Attesting Officer

C. MARSHALL DANN
Commissioner of Patents and Trademarks